United States Patent

[11] 3,575,192

| [72] | Inventor | Stanley I. MacDuff<br>South Bend, Ind. |
|---|---|---|
| [21] | Appl. No. | 794,091 |
| [22] | Filed | Jan. 27, 1969 |
| [45] | Patented | Apr. 20, 1971 |
| [73] | Assignee | The Bendix Corporation |

[54] VEHICLE HYDRAULIC SYSTEM AND PRESSURE REGULATOR THEREFOR
3 Claims, 1 Drawing Fig.

[52] U.S. Cl. .................................... 137/116,
137/116.3, 137/117, 137/118
[51] Int. Cl. ............................................ G05d 11/00
[50] Field of Search .................................... 137/101,
109, 115, 116, .3, .5, 117, 118

[56] References Cited
UNITED STATES PATENTS
| 2,799,996 | 7/1957 | Van Meter | 137/118 |
| 2,818,711 | 1/1958 | Lincoln et al. | 137/118X |
| 2,846,850 | 8/1958 | Hall | 137/118X |
| RE24,892 | 10/1960 | Banker | 137/117X |
| 2,971,523 | 2/1961 | Dudley | 137/118X |
| 3,011,506 | 12/1961 | Schwartz et al. | 137/117X |
| 3,099,284 | 7/1963 | Thrap et al. | 137/118X |
| 3,125,110 | 3/1964 | Allen et al. | 137/101 |

Primary Examiner—William F. O'Dea
Assistant Examiner—David J. Zobkiw
Attorneys—Richard G. Geib and Plante, Arens, Hartz, Hix and Smith

ABSTRACT: A hydraulic system for a vehicle having a conventional open-center steering system powered by an engine-driven rotary pump with a valve that enables a small portion of the fluid delivered by the pump to be stored in an accumulator between predetermined pressure limits. The invention visualizes the use of the fluid in the accumulator for such purposes as actuating a power brake booster and/or other devices within the vehicle.

PATENTED APR 20 1971
3,575,192
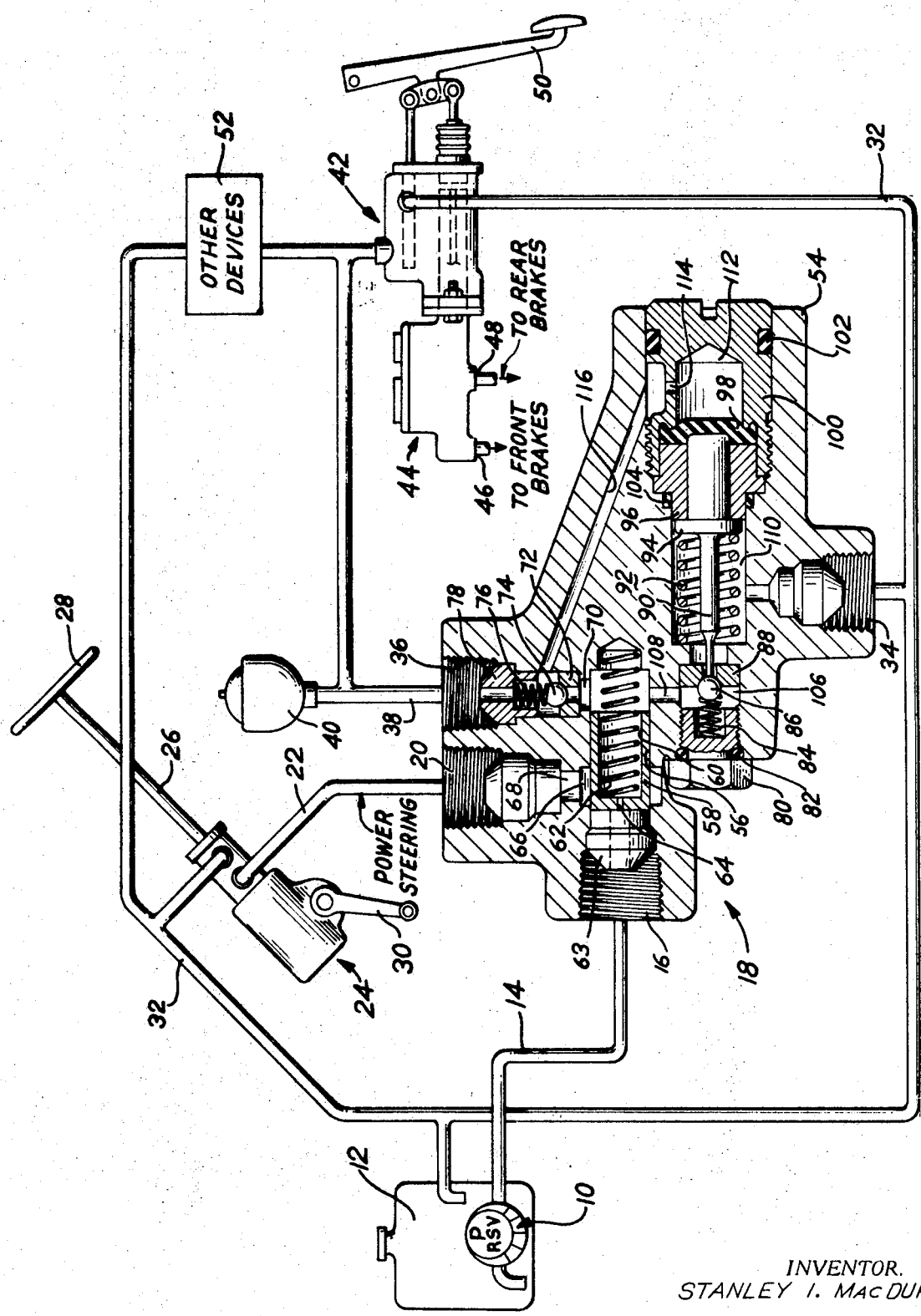
INVENTOR.
STANLEY I. MacDUFF
BY
Richard G. Geib
ATTORNEY

VEHICLE HYDRAULIC SYSTEM AND PRESSURE REGULATOR THEREFOR

SUMMARY

An object is to provide a flow-divider regulator, also sometimes called an unloading valve, of novel construction for use in a hydraulic system for a vehicle to enable its use with open-center and closed-center control valves and appurtenances.

DRAWING DESCRIPTION

In the drawings, the FIGURE shows a somewhat schematic longitudinal cross section of the regulator valve, according to my invention, connected into a diagrammatically represented hydraulic system for a vehicle.

DETAILED DESCRIPTION

Referring now to the drawing, 10 designates a rotary vane pump which would preferably be driven by a belt from the engine crankshaft and which may be mounted in a reservoir 12 providing a supply of fluid. The discharge of this pump is conducted by a conduit 14 to a pump inlet port 16 of an unloading valve, which I will designate generally by the numeral 18. A power steering port 20 is connected by a conduit 22 to the inlet port of the open-center valve portion of the power steering gear 24, which is of conventional construction and will not be described in detail. The steering gear is shown with a steering column 26 and steering wheel 28 by means of which the driver controls the vehicle. Output of the steering gear is connected to the steering linkages through a pitman arm 30. The outlet port of the steering valve is connected back to the reservoir through a common return line, which I have designated generally as 32. A reservoir or return port 34 in the flow-divider regulator valve is also connected to the common return line 32. An accumulator port 36 in the valve 18 is connected by a line 38 to an accumulator 40. The accumulator may be of the generally spherical type, including an air chamber and a liquid chamber separated by a suitable diaphragm and having the air chamber pressurized initially at some suitable level. Branches of the accumulator line 38 are shown leading to a power brake booster device, which I designate generally as 42, which may be of the type shown in H. L. Schultz U.S. Pat. No. 2,925,805 assigned to the common assignee of this application. The brake booster device may have mounted on it a conventional split hydraulic master cylinder 44 which has discharge ports 46 and 48 leading to the front-wheel brakes and rear-wheel brakes, respectively. The brake booster device may be arranged to be actuated by a pedal 50 positioned for actuation by the driver in the usual manner.

A branch of the accumulator connection 38 is shown connected to a box 52 labeled "Other Devices" which might be such things as windshield wipers, seat regulators, convertible top actuators, suspension levelling devices, etc. These devices would have suitable control valves and actuating cylinders, not shown in detail, and fluid used would be returned to the system through another branch of the return line 32, as illustrated.

Returning now to a detailed description of the flow-divider regulator valve 18, it is made up generally of a body casting 54, which may be of a gray iron or other suitable material. The pump port 16 is shown as forming the mouth of a valve bore 56 which contains, in close fitting slidable relationship, a valve plunger 58 of generally cylindrical shape having a large internal cylindrical recess 60 receiving one end of a control spring 62, the other end of which is seated in the end of the bore 56.

A tube seat insert 63 of conventional construction is pressed into the port 16 and performs a double function of forming a seat for the connecting conduit and a stop and retainer for the valve plunger 58. The valve plunger 58 is also formed with a small bleed orifice 64 passing through its end wall so as to permit a limited flow of fluid through the plunger from the pump port 16 to the right-hand or spring-containing cavity of bore 56. When plunger 58 is in its free position, urged by the spring leftward into contact with the base of the tube seat insert, a recess 66, to which the power steering port 20 is connected by a drilled passage 68, is blocked from receiving any fluid from the pump port 16. However, as will be described later in connection with operation of the system, it will be noted that if the plunger 58 is moved to the right a short distance, such communication can be established. The accumulator port 36 is positioned in the casting so that a drilled passage 70 extending therefrom intersects the spring-containing cavity of the valve bore 56. This drilled passage 70 is formed with a suitable shoulder so that a check valve seat 72 can be pressed into it against said shoulder and a check valve ball 74 positioned on said seat is nominally urged into contact with the seat by a check valve spring 76, the other end of which is seated in a cavity-forming part of the passage through another tube seat insert 78. The valve casting 54 is provided with a second bore extending generally parallel to the first one from one end of the casting to the other which contains, going from left to right, the following components, suitably installed and secured: a threaded closure plug 80 whose hexagon-shaped head is sealed to the casting by means of a rubber gasket 82; a small valve spring 84 seated in a recess in said closure plug and urging an unloading pilot valve ball 86 against its pressed-in seat 88; a pilot-valve-operating plunger 90, urged to the right by a calibrated control spring 92 (a flange 94 between the ends of the plunger 90 forms a stop for the plunger against a bushing 96 in which a cylindrical portion of the plunger 90 is closely fitted); a sealing diaphragm 98 covering the end of plunger 90 and bushing 96 and having its outer margins clamped by a closure member 100 threaded into the right-hand end of said second transverse passage. A rubber sealing ring 102 seals the end of the threaded bushing 100 against external leakage. Another rubber O-ring 104 seals the outer periphery of the bushing 96.

The several parts described divide the said second transverse passage into chambers. The first of these is a pilot-valve-ball-containing chamber 106 between said closure plug 80 and valve seat 88. This chamber is in communication with the spring chamber of passage 56 by means of a small drilled hole 108 which is an axial extension of the drilled passage 70 from the accumulator port. It will be noted that this small passage 108 is so positioned that as the valve plunger 58 is moved to the right to provide communication between the pump port and the power steering port, the right-hand end of the plunger will approach said passage 108 and further movement will enable the plunger to restrict the flow of liquid from the spring chamber into said passage. The second of these chambers is a spring chamber 110 positioned between the valve seat 88 and the bushing 96. This chamber 110 contains the calibrated spring 92 and communicates with the reservoir port 34. The last chamber is an internal cavity 112 formed in the threaded closure member 100. This chamber is in communication with pressure from the accumulator by means of a transverse drilled passage 114 which communicates with a passage 116 which is drilled through the casting 54 until it intersects the accumulator port drilled passage 70 in the space between the check valve ball seat 72 and the tube seat insert 78. The diaphragm 98 forms one wall of this chamber and is, therefore, continuously exposed to accumulator pressure.

OPERATION

The operation of my novel flow-divider unloading valve will now be described in detail. As is well known in the art, the pump 10 produces a regulated flow, which may be in the nature of 2 gal./min., and this flow is normally not pressurized until power steering function is required and the steering wheel is moved, causing the valve in the steering gear to restrict pump flow and, thereby, increase the pressure in the system. A small portion of the pump flow entering the port 16 will pass through the orifice 64 into the spring chamber. This fluid will then pass through the drilled passage 108 into the pilot valve ball chamber 106. Assuming that the accumulator is charged and adequate pressure is in communication with recess 112 to act upon the diaphragm 98, the plunger 90 will have been moved against the force of the calibrated spring 92 so that the stem of the plunger 90 will have lifted the ball from its seat. In this case, the fluid flows past the ball through the central orifice of the valve seat into the spring chamber 110 and thence to reservoir through port 34. The orifice 64 should be so sized that a flow therethrough of possibly 0.1 gal./min. will create a pressure drop such that the pressure on the left-hand end of plunger 58 exceeds that in the spring chamber sufficiently to exert a force on the area of plunger 58 which exceeds the installed load of the spring 62, and the plunger 58 will, therefore, move to the right, opening communication between ports 16 and 20 by means of the annular recess 66 and drilled passage 68, permitting the remainder of the pump flow, which would then be approximately 1.9 gal./min., to continue to the steering gear and thence to the steering valve, to conduit 32, and back to the reservoir. If the power steering system is actuated, causing restriction in the flow, pressure will rise in conduit 22 and also in conduit 14 and the increase in pressure will have a tendency to increase the flow through the orifice 64. This increased flow results in increased pressure drop, which will cause the plunger 58 to move further to the right until it partially covers the drilled passage 108 and adds sufficient restriction to the flow to maintain the predetermined quantity of approximately 0.1 gal./min. Inherently there will be a slight increase in flow because of the slight increase in pressure drop required to compensate for the added load of the spring. Thus, it will be seen that regardless of whether the power steering system is used or not, a more or less closely regulated small flow will continue through orifice 64 as previously described.

If the power brake booster 42, or other devices 52, are operated, pressure in the accumulator will fall and, as a result, the force exerted on the diaphragm 98 and plunger 90 will be reduced. As this happens, the spring 92 will force the plunger 90 to the right and, at some preestablished low level of accumulator pressure, the ball 86 will be brought into such proximity to the seat 88 that a pressure drop will be created by the fluid flow past the ball and the seat. This pressure drop creates additional force on the plunger 90, adding to the force of the spring 92 and resulting in still further rightward movement of plunger 90. This, in turn, develops further pressure drop and the final result of these changing relationships will be that the ball comes into full contact with the seat and the fluid flow to the reservoir through passage 34 will be stopped. This will result in a further rise of pressure in back of the ball 86, resulting in an increase in pump pressure in conduit 14 and the pump inlet port 16. This would appear to result in increased flow past the end of the plunger into recess 66 into the port 20 and conduit 22 to the power steering gear. However, the momentary cessation of flow through passage 64 reduces the pressure drop and, therefore, the pressure difference between the ends of the plunger, causing the plunger to move leftward, increasing the restriction between the pump port and the power steering port. As the pressure in the system rises, it will, in a very brief time, equal the pressure in the accumulator system, at which time the interrupted flow through the port 64 will be able to lift the check valve ball 74 and pass on to the accumulator through port 36 and conduit 38. This flow into the accumulator compresses the gas charge so that the accumulator pressure increases. At some predetermined high limit of pressure, the force which it exerts on the diaphragm 98 will have increased to the point where it can overcome the combined load of the spring 92 and the pressure on the left face of ball 86, whereupon the ball 86 will be lifted from its seat. As it begins to lift from its seat, fluid will again start flowing into passage 108, into the spring chamber 110, and thence into reservoir 12. This obviously results in a drop in system pressure so that flow to the accumulator will cease and the accumulator check valve ball 74 will return to its seat. With the complete release of pressure in the cavity 106, the pressure difference which existed across the ball just prior to this function, having been completely dissipated, the accumulator pressure on diaphragm 98 obviously exceeds the load of spring 92 by that amount and, therefore, the plunger 90 will move to the left a substantial distance, lifting the ball 86 well free of the seat 88 until the spring load increases sufficiently to balance the force on the plunger. By proper selection of the relative areas of plunger 90, the ball seat 88 and load and rate of spring 92, the valve can be made to operate between any suitable predetermined high and low pressure limits.

It will be seen that my system operates to divide the pump flow in a suitable predetermined ratio and provides for the smaller portion of flow to be delivered alternately to a suitable accumulator at desired pressure levels or back to the reservoir when the accumulator is fully charged, while the major portion of pump flow continues to pass through the open center power steering gear valve in the usual manner; and it should be understood that the operation of either system does not in any way alter or affect the behavior of the other.

A substantial economy results from the ability to use only one pump, since the provision of a second pump for the braking system and for operation of the other devices would represent a substantially greater cost than that represented by my novel flow-divider regulator valve.

I claim:

1. In a valve:

a housing having a fluid inlet, a pair of fluid outlets, and a bore communicating the inlet with the outlets;

one of said outlets being in fluid communication with means for storing fluid under pressure;

first valve means slidable in said bore dividing the latter into first and second chambers;

said inlet and the other outlet being in fluid communication with said first chamber;

said one outlet being in fluid communication with the second chamber;

an orifice in said first valve means permitting metered flow of fluid from said first chamber to said second chamber;

resilient means yieldably urging said first valve means toward a position terminating fluid communication between said inlet and the other outlet;

a third fluid outlet in fluid communication with said second chamber;

normally closed second valve means within said housing for controlling flow of fluid between said second chamber and said third outlet independently of said first valve means; and means communicating said fluid storage means with said second valve means for opening the latter when the fluid pressure level in said fluid storage means exceeds a predetermined level.

2. The invention of claim 1; and an elongated compartment within said housing in fluid communication with said second chamber and with said third outlet;

said second valve means being disposed within said compartment and including a valve seat circumscribing the latter, a valve member yieldably urged against said seat to terminate fluid communication through said compartment between said second chamber and said third fluid outlet, and a plunger for forcing said valve member from said seat;

said plunger dividing said compartment into a first section housing said second valve means and a second section;

said communicating means communicating said fluid storage means with said second section whereby an increase in the fluid pressure level in said fluid storage means above a predetermined level operates said plunger to force the valve member from the valve seat to permit fluid communication between said second chamber and said third fluid outlet.

3. The invention of claim 2; said communicating means being a passage formed within said housing between said one fluid outlet and said second section.